United States Patent [19]

Cason et al.

[11] 4,370,645
[45] Jan. 25, 1983

[54] GHOST CURSOR IN DISPLAY ALL CODES MODE

[75] Inventors: William C. Cason, Austin; Ward A. Kuecker, Round Rock; Susan D. Stratton, Austin, all of Tex.

[73] Assignee: International Business Machines Corporation, Armonk, N.Y.

[21] Appl. No.: 274,047

[22] Filed: Jun. 16, 1981

[51] Int. Cl.³ .............................................. G09G 1/02
[52] U.S. Cl. ................................... 340/709; 340/711; 340/798
[58] Field of Search ............................... 340/709, 711

[56] References Cited

U.S. PATENT DOCUMENTS

| | | | |
|---|---|---|---|
| 3,648,271 | 3/1972 | McConnell et al. | 340/791 |
| 3,974,493 | 8/1976 | Cavaignac et al. | 340/711 X |
| 4,121,228 | 10/1978 | Cowe et al. | 340/711 X |
| 4,200,869 | 4/1980 | Murayama et al. | 340/709 X |
| 4,203,107 | 5/1980 | Lovercheck | 340/709 X |
| 4,225,943 | 9/1980 | Busch | 364/900 |
| 4,228,430 | 10/1980 | Iwamura et al. | 340/709 |

OTHER PUBLICATIONS

IBM Technical Disclosure Bulletin, vol. 18, No. 4, Sep. 1975, "Shadow Cursor", D. J. Busch and J. C. Moses, pp. 974-975.

*Primary Examiner*—David L. Trafton
*Attorney, Agent, or Firm*—Douglas H. Lefeve

[57] ABSTRACT

A ghost cursor indicates the relative horizontal position on a display screen associated with a printed document rendition of the displayed text and control codes. In a normal, or hidden codes, mode of operation the ghost cursor, placed on an escapement scale line, is vertically aligned with a text cursor which is positioned adjacent the displayed text code which defines the present point of operation. In the all codes mode, all text and control codes (such as required backspaces, tabs, etc.) are displayed. In the all codes mode the ghost cursor indicates the relative horizontal position on the display screen of the code associated with the text cursor, with forward or reverse escapement indicated by the control codes taken into account.

11 Claims, 16 Drawing Figures

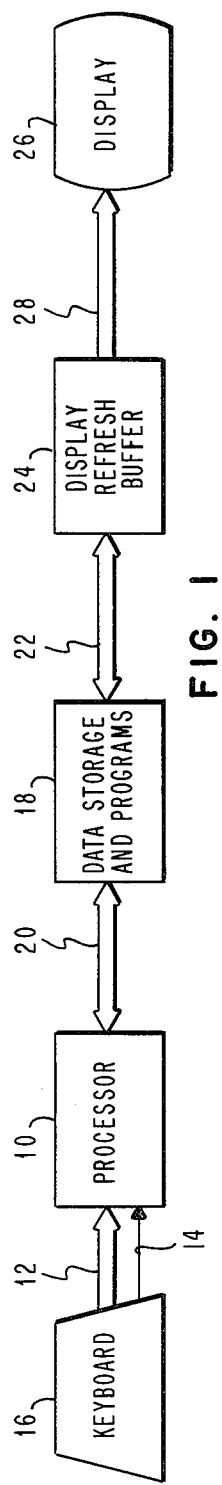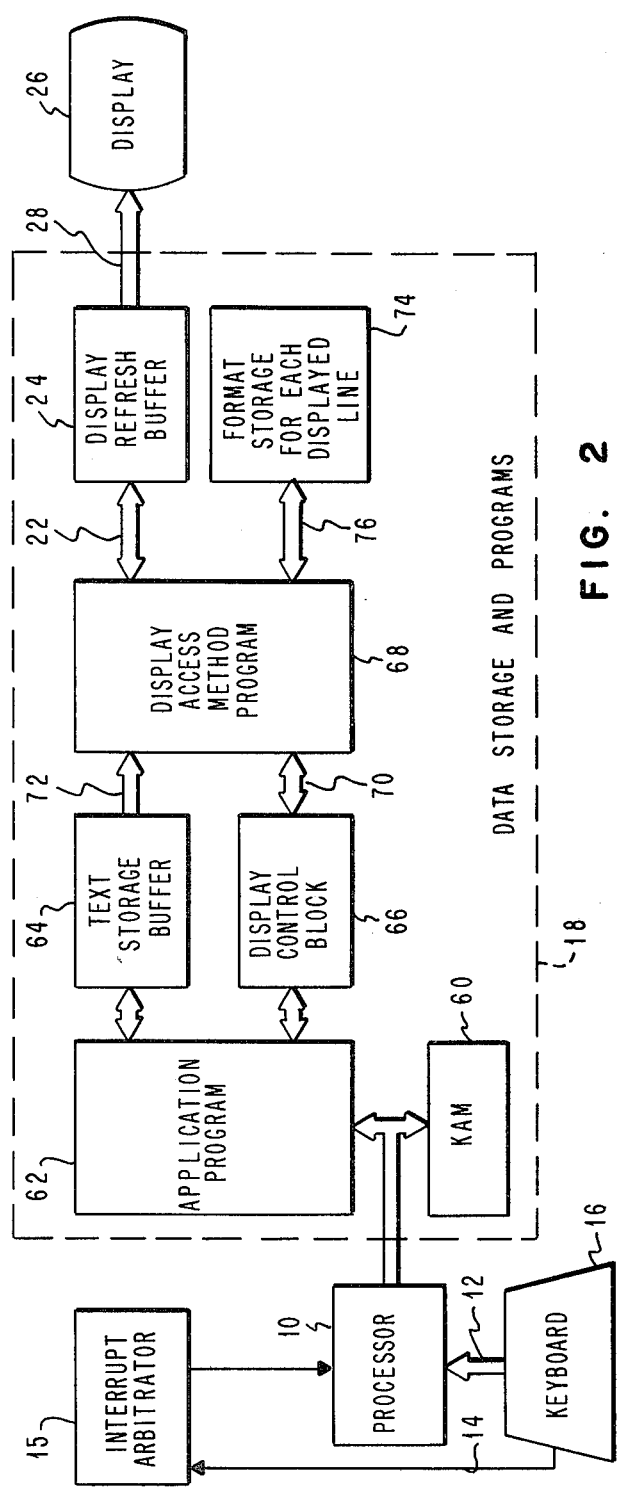

GHOST CURSOR IN DISPLAY ALL CODES MODE

BACKGROUND OF THE INVENTION

1. Field of the Invention

This invention relates to display systems capable of simultaneously displaying a frame of text and control codes.

2. Description of Prior Art

Office machines for processing text data to produce hard copies utilize display screens for visually displaying text to an operator as the text is originally keyed or later edited. Typically, such machines incorporate a conventional typewriter keyboard with additional control keys for operator interface with the system controls. The operator keystrokes are often displayed on a cathode ray tube (CRT) screen quite similar to a home television receiver screen. This screen may display a full page of text, a partial page, or in some machines only a single line of text. The display may provide, in addition to a visual presentation to the operator of the text being prepared, prompting instructions for the operator of how to interface with and operate the machine.

Responding to the keyboard strokes of an operator are system controls including programmed computers which prepare the text display. Most present day text processing systems include electronics hardware programmed to recognize the operator keystrokes and to control the display. This hardware includes memory for storing character data and instruction data for future use in editing and in the preparation of hard copy. Ease of operation of the machine by the operator is in large part determined by the electronics and the associated computers and programs therefor.

An area of importance in determining the ease with which an operator interfaces with a machine is the movement of a cursor, that is, an identification mark on the screen indicating a character position. A cursor has been typically used by an operator in text editing functions including the insertion of additional characters into text, identifying characters or blocks of characters to be moved, deleted or copied, and the reformatting of the text display.

An escapement scale line as a part of the display frame has also been employed in prior art systems to provide another operator aid. The scale line on the display screen is used in the same way by the operator creating and editing the text as is the familiar scale line on the typewriter as an aid to the operator in determining the relative horizontal position along the line at which an editing operation is to occur in accordance with the then present cursor position.

The cursor, heretofore referred to will hereafter be referred to as the text cursor. Another cursor has sometimes been included adjacent the scale line and has been called the ghost cursor. This cursor reflects the horizontal line position of the text cursor by highlighting this horizontal position adjacent the scale line so that it is unnecessary for the operator to note the horizontal position of the text cursor and then look vertically up the screen to determine the exact horizontal position of the text cursor in accordance with the scale line markings.

As an additional operator aid, prior art text display systems have been operable in two different modes of operation for displaying text. In the normal or hidden operation codes mode, control codes such as required backspace, carrier return, tab, etc. codes are not visually displayed to the operator unless the text cursor is presently addressing such a code in memory in which case only that single code is displayed as a control code. What has been displayed to the operator in the hidden codes mode (ignoring the scale line, code at the cursored location, or any prompting lines) is the text as it will be actually printed on a page of paper. Thus, alphanumeric characters and symbols are displayed including such characters as underscore characters since this kind of text is printed. On the other hand, if the word cat is keyed as "c", "a", "t", "required backspace", "required backspace", "required backspace", " ", " ", " ", this appears on the printed page as "cat". If the operator keys this text as just described and decides to remove all of the underscoring except the underscore under the first letter, "c", of the word, one way to do this would be to remove the second two underscore characters and add two space codes in their place. Another was to do this would be to remove all of the required backspace codes and all of the underscore codes from their original positions and add a single required backspace code and a single underscore code after the "c", and before the "a", in "cat". In either of these cases it is a great benefit to the operator to display all of these codes in a serial fashion, including the non-printing required backspace codes in the second of the two prior art display modes known as the all codes mode. In this mode the operator positions the text cursor adjacent the appropriate backspace or underscore codes to be deleted or otherwise edited and is able to easily access these normally non-displaying codes when they are, in this mode, displayed.

In the all codes mode however, due to the operation of linearly and sequentially displaying all of the codes in a serial fashion relative to each line of text, it becomes very difficult to visualize a given cursored position relative to where the cursor would actually be in the normal or hidden codes mode and, therefore, where the operating point would actually be on a printed page of text. The problem is perhaps most easily understood when considering the editing of a multi-columnar document in which a relatively large number of normally non-displaying control codes are included with the entries in each column. When editing such a document in the all codes mode it is quite possible to observe the text cursor position significantly beyond the outer boundaries of the particular column in which the text associated with the text cursor position is to be displayed. In extreme cases an operator might observe the text cursor in a horizontal frame segment separate from the frame in which the column of text is normally shown in the hidden codes mode.

It would, therefore, be of great advantage and utility for an operator to be provided with an indicator to show, while operating in the all codes mode, the horizontal position at which the text cursor would be located if the display were presently operating, instead, in the hidden codes mode.

SUMMARY OF THE INVENTION

Accordingly, with the present invention the display is operable in all codes mode for displaying a frame of text and control codes including a text cursor adjacent a text code or control code at which a text processing operation can next be effected. In this all codes mode the text cursor is operable in the same manner in which it is operable in the hidden codes mode, that is, the text cursor is used to address a location relative to text or control codes at which an editing operation is to take place. With this invention a ghost cursor is also displayed adjacent the scale line to show the relative horizontal position along the text line to which the code addressed by the text cursor corresponds when the document is displayed in the hidden codes mode or when the document is printed on a printer. When columnar jobs are being created or edited, this is especially helpful to the operator to prevent the loss of column identity to the operator during editing in the all codes mode.

The foregoing and other features and advantages of the invention will be apparent from the following more particular description of a preferred embodiment of the invention, as illustrated in the accompanying drawings.

BRIEF DESCRIPTION OF THE DRAWINGS

FIG. 1 is a basic block diagram of a typical text processing system including a keyboard, processor, memory storage, and a display screen for visual presentation to an operator of text and operating instructions.

FIG. 2 is a detail showing the formatting of the storage for the system of FIG. 1 as structured for the ghost cursor operation in the all codes mode.

FIGS. 8-10 illustrate the operation of the BUILD SCALE LINE subroutine called during the operation of the display access method of FIG. 4.

DESCRIPTION OF THE PREFERRED EMBODIMENT

Figure 3:
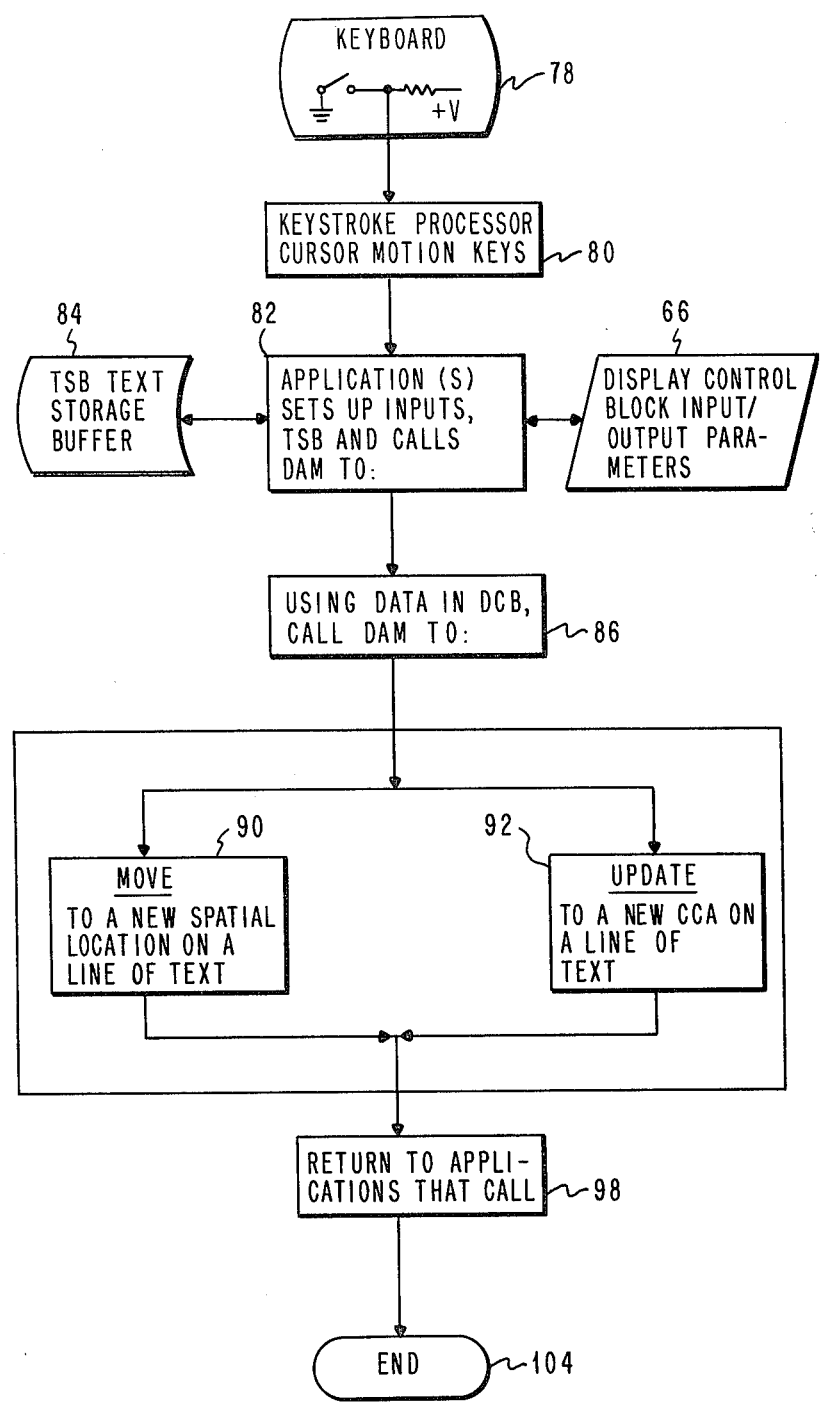
FIG. 3 illustrates the operation of the processor of FIG. 1 with instructions in the display control block to update and move the text and ghost cursor.

Referring to FIG. 1, a text processing system is shown including a processor 10 interconnected by means of data bus 12 and control lines 14 to a keyboard 16. Included on the keyboard are conventional alphanumeric characters found on the standard typewriter keyboard. In addition, the keyboard includes control keys, such as backspace, carrier return, and tab, along with function keys used to instruct the system to perform certain operations, to control the way a display is created, or to provide information about stored text data. In addition, the keyboard includes a CODE key that is used in conjunction with other keys to input special instructions to the processor 10 by way of alternate labels on these other keys which are activated by use of the code key. For example, a required backspace code is generated by holding the code key depressed during depression of the backspace key.

Keystroke data transferred to the processor 10 over the data bus 12 in the form of, for example, 7 bit bytes is processed by instructions stored in a random access memory 18 by means of an interconnecting data bus 20. The random access memory 18 stores the keystroke data bytes in addition to instructions for operation of the processor 10.

Also connected to the random access memory 18 by means of a data bus 22 is a display refresh buffer 24 that receives display data for formatting a visual presentation on a display screen 26. Control signals for operation of the display screen 26 are provided along a data bus 28.

Typically, the display screen 26 is a cathode ray tube, and in a preferred embodiment of the present invention, was formatted into four virtual images, the major one of which displayed twenty lines of text information. The total line capacity of the display was twenty-five lines with the first two lines reserved as a virtual display for document formatting information and the bottom two lines of the display reserved for virtual images as a prompt line and a message line to give an operator instructions on the control of the text processing system of FIG. 1. Those skilled in the art, of course, will appreciate that alterations from the described embodiment may be made relative to the number of lines displayed and the prompting information displayed without departing from the spirit and scope of the invention.

Referring to FIG. 2, there is shown one operational format of the random access memory 18 that includes storage locations defining the display refresh buffer 24. In FIG. 2 the keyboard 16 is shown with the data bus 12 connected directly to the processor 10 while the control bus 14 is connected through an interrupt arbitrator 15 to the processor. The interrupt arbitrator 15 is hardware logic that receives all system interrupts and processes them on a priority basis to the control logic of the processor 10. For purposes of describing the present invention directed to the positioning of a ghost cursor in a display all codes mode, only the keystroke interrupt will be considered.

As formatted, the random access method 18 includes a keystroke access method 60 made up from defined storage locations. It should be understood that each of the identifiable areas of storage in the random access memory 18 comprise storage locations addressable by conventional techniques. Thus, the keystroke access method 60 receives keystroke data bytes over the data bus 20 which is also connected to an application program memory 62. Stored in the application program memory 62 are application programs consisting of instructions and data bytes transferred between the application program memory 62 and a text storage buffer 64 or a display control block memory 66. As the name implies, the text storage buffer (TSB) 64 contains a data stream of unformatted text. Each byte in this data stream is either a graphic item (that is, character, number, etc.) of single byte length, a single byte control instruction (that is, a line end, tab stop, carriage return, etc.) or a multi-byte control code. A multi-byte control code is a string of data "n" bytes long that contains information on how to format the data stream in the text storage buffer. Typical of multi-byte control codes are "left" and "right" margin settings, tab stops, character pitch, etc. Thus, the text storage buffer 64 is that area of the random access memory 18 that contains the data stream, part or all of which is to be formatted on the display screen 26.

That area of the memory 18 identified as the display control block 66 receives data and instructions from the applications program memory area 62 to generate formatting instructions to a Display Access Method (DAM) program 68. These formatting instructions are passed between the display control block and the DAM program 68 by means of an instruction bus 70.

Also received by the display access method program 68 are graphic bytes and control bytes from the text storage buffer 64 on a data bus 72.

In response to instructions from the display control block 66, the Display Access Method program 68 formats the data from the text storage buffer 64 for inputting to the display refresh buffer 24 over the data bus 22. Also required for formatting of a display by the DAM program 68 is display information stored in a format storage area 74 which data is transferred between the DAM program 68 and the storage 74 by means of a data bus 76.

By operation of the random access memory 18 in conjunction with the processor 10, the manner to be described with reference to FIGS. 3–16, a display all codes presentation of text and control codes is made on the display screen 26 that includes a ghost cursor at a horizontal location related to display of the text in the hidden codes mode.

Typically, the random access memory 18 contains instructions and data stored therein at various address locations. Instructions are loaded into the random access memory 18 for formatting the address locations to perform the function identified to the system. Alternatively, the random access memory may be replaced entirely by a combination of hard wired logic which would also replace the processor 10 such that "instructions" and the processor are not utilized. The flow diagrams described hereinafter will enable any person having skill in the art of logic design to specify hardware logic in accordance with the concepts of the claimed invention. These flow diagrams will also enable anyone having skill in the art of computer programming to program a general purpose digital computer to perform the functions described, that is, movement of a ghost cursor on the display of a text processing system operating in a mode to display all codes.

Prior to continuing with the description of the figures describing ghost cursor positioning, certain terms need to be defined to assist in an understanding of the invention.

DEFINITIONS

1. TEXT STORAGE BUFFER (TSB) is the area 64 in the random access memory 18 that contains the data stream, all or part of which is to be formatted on the display screen 26.
2. CONTEXTUAL CURSOR ADDRESS (CCA) is the address in the data stream that the operator perceives as an edit point; this address can be any place within the defined boundaries of the text storage buffer.
3. CURSOR LINE ADDRESS (CLA) is the text line starting address on which is found the contextual cursor address.
4. LEFT PAPER EDGE (LPE) is the left edge of a paper upon which the text in the text storage buffer will be printed.
5. TEXT LEFT MARGIN (TLM) is the number of white character spaces from the left paper edge to the first position for graphic display on a line of displayed text.
6. SCREEN WIDTH (SW) is the number of character boxes (spaces) on a horizontal line of the display screen 26. This is also identified on occasion as display size (DS).
7. TEXT TUBE LEFT (TTL) is the number of character spaces from the left paper edge to and including the first character position at the left edge of a line of text on the display screen 26. (Note: For hidden codes mode TTL is also used for the text line.)
8. SPATIAL CURSOR (SC) is the (X) and (Y) position on the display screen 26 of the contextual cursor address as perceived by the operator where Y is the number of lines down from the top of the display and X is the number of character boxes from the left edge of the display area.
9. DELTA X ($\Delta X$) is the left or right spatial difference from the present X position to a new spatial position the operator identified by keystroke entry.
10. ESCAPEMENT CHARACTER OUTPUT (ECC) is the number of escaping characters from the LPE through the CCA for the cursored text line.
11. ESCAPING CHARACTERS are the displayable graphics that are printed.
12. NON-ESCAPING CHARACTERS are the control codes in the data stream that are not printed.
13. DISPLAYABLE CHARACTER COUNT (DCC) is the total number of escaping and non-escaping characters from the LPE through the CCA for the Cursored Text Line.
14. DISPLAYABLE CHARACTERS TUBE LEFT (DCTL) is the total number of escaping and non-escaping characters from the LPE to and including the first character position at the left edge of the display for the text line.
15. SCALE is a numbered grid indicating the character positions of the printed horizontal text line relative to the LPE. For the current Cursored Text Line, it can also indicate the following:
    a. Left, right margins
    b. Tab stops and type
    c. Page edge
    d. Edit point (Scale Ghost Cursor)
16. DISPLAY CONTROL BLOCK (DCB) is an area in memory used by the DAM and the application (user of DAM) for input data (parameters) to the DAM to change the display image and as an output area for data from the DAM to the application.
17. Refresh Buffer (RB) is the area in memory in which the DAM stores the formatted text. This formatted text is periodically read by the CRT hardware from the refresh buffer for rewriting the CRT.

18. White space is the display space free of any text display. For example, the space between the left paper edge and the left margin is white space.

As a further explanation prior to proceeding with description of FIGS. 3-16, it should be pointed out that the display screen 26 does not necessarily include all the text data in the text storage buffer 64. Only a limited number of text lines will be displayed whereas the total number of text lines may often exceed this number. Further, text line lengths stored in the text storage buffer 64 may exceed the number of character boxes available on the display screen 26. Multiescapement character count and the line end count are used to support the vertical segmentation and horizontal segmentation to enable the formatting of data to fit within the display screen outline limitations. The term horizontal shift (HS) also relates to the ability to segment the display in a horizontal direction. When a horizontal shift is required, a new display will contain about 25% of the previous display, although a greater or lesser percent of the overlap is acceptable. In one implementation of a text processing system incorporating the present invention, the display screen 26 is 80 character boxes wide and a segmentation will overlap twenty characters of the previous display on the new display.

Referring to FIG. 3, there is shown a flow diagram of the operation of the DAM program 68 for displaying text on the display screen 26. An operator inputs a keystroke at 78 to establish a cursor position in either the vertical or horizontal position displayed from the present cursor position on the display screen 26. This cursor keystroke is processed into a spatial cursor position to identify a new cursor spatial location on the display screen 26. The keystroke is processed in the processor 10 at 80 and input into the keystroke access memory 60. An application set-up is selected at 82 which, for purposes of the description of the present invention, will be defined as a text application. The various application programs are called by a command from the applications program 62 in response to an interrupt. Other application programs for display include a "menu" application, multiple virtual image displays, and a diagnosis application. The X-Y cursor application is selected from the application program 62 that calls the DAM program 68. The DAM program 68 retrieves instructions from the display control block 66 and for a text display looks to the text storage buffer 84 to provide graphic and control data bytes.

After retrieving data from the text storage buffer 64, the Display Access Method program 68 receives data from the display control block 66 and calls one of several subroutines by a call from control block 86. One subroutine 90 that is available to be called is identified as a "MOVE" and during the running of this subroutine the Display Access Method program 68 converts a spatial location, relative to a current spatial cursor position, to its contextually equivalent location. This subroutine is called to resolve a contextual pointer position and receives a spatial location an an input and outputs the corresponding contextual location. Another possible subroutine called by the DAM program 68 at control block 86 is identified as an "UPDATE" subroutine 92. This subroutine provides instructions for operation of the Display Access Method program 68 to update the textual display starting with the line on which the cursor presently appears on the display screen 26. During this subroutine the Display Access Method program 68 reformats the identified line and performs horizontal or vertical segmentation as required.

Following the return of either of the subroutines 90 or 92 to the routine of FIG. 3, an application check 98 is made on the output data in the display control block to again run the DAM program 68. The program call may be for another operation of the text processing system or the program may step to an end at 104.

Figure 4:
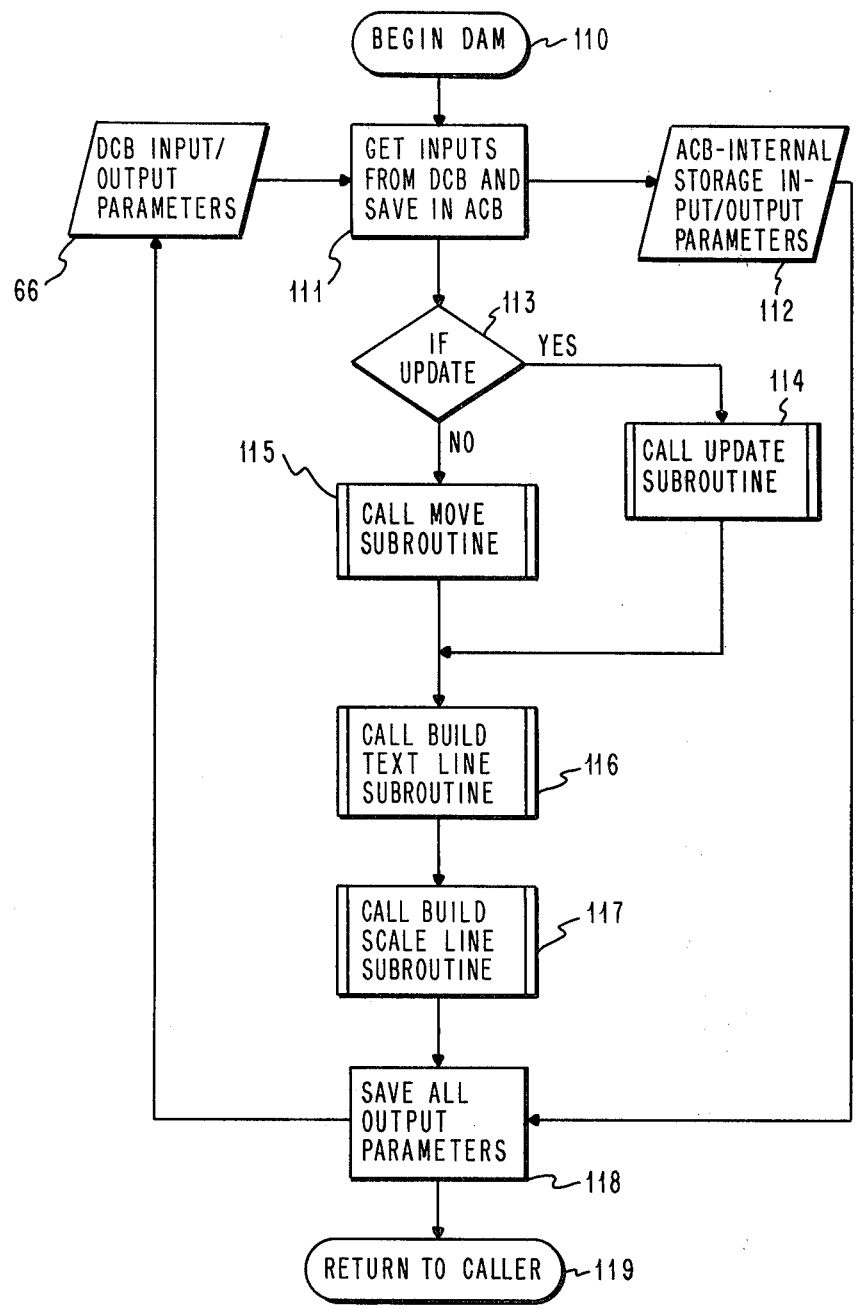
FIG. 4 illustrates an operation for selecting one of several subroutines called for displaying text and a scale line with a properly positioned ghost cursor on the display screen when the position of the text cursor is either moved or updated.

FIG. 4 shows the routines called for displaying text and a scale line in all codes mode with a ghost cursor positioned adjacent the scale line at the horizontal position thereof corresponding to the horizontal coordinate at which the text cursor would be if the displayed text were being displayed in the hidden codes mode. The Display Access Method begins by virtue of a command at 110. This begin command relates to block 86 in FIG. 3 at which point the DAM is called to perform an UPDATE operation or a MOVE operation. In either case the UPDATE or MOVE command is passed to 111 and is, therefore, available for the decision at 113 of whether the UPDATE subroutine or the MOVE subroutine is performed.

Assuming that the command was for an UPDATE a plurality of parameters from the DCB 66 are called at 111 to be transferred into the Analysis Control Block (ACB) 112. The ACB will store these parameters throughout operation of the DAM for use by the various routines invoked. Among the parameters passed from the DCB 66 to the ACB 112 for the UPDATE command are the CLA, the left margin setting for the cursor line and the CCA. The DCTL and TTL are also loaded into the ACB. The DCTL and TTL may be given values, or predefined default values can be later used. Additionally, the status of whether the display operation is in the all codes mode or the hidden codes mode is loaded into ACB. The line number on the screen on which the text cursor is positioned as well as the line number on the screen on which the scale is to be built are also loaded into the ACB.

Since the decision at 113 for this example is that the command is an UPDATE command, the UPDATE subroutine is called and performed as indicated at 114. This subroutine will be described in detail relative to FIG. 5. At the conclusion of the UPDATE subroutine the BUILD TEXT LINE subroutine is invoked at 116. This subroutine will be described in detail relative to FIG. 11. At the conclusion of the BUILD TEXT LINE subroutine the BUILD SCALE LINE subroutine at 117 is invoked, as will be discussed in detail relative to FIGS. 8-10. At the end of each of these subroutines all of the output parameters generated thereby and stored at the end of each subroutine in the ACB are transferred from the ACB 112 to the DCB 66. At this point the screen has been updated and the operation returns to the caller as indicated at 119.

The description above relative to FIG. 4 broadly describes the display operation which embodies the present invention. That is, a keystroke can result in either an operation to update the positions of the text and ghost cursor on the screen relative to displacing the cursor from one text position on a line to another text position on the same line, or a move operation can be called for by the keystroke which involves horizontal movement of the cursor from the text on a given line to white space on that line or a move of the cursor vertically from one line to another. In either case the appropriate UPDATE or MOVE operation is undertaken after which the affected text lines on the screen are built and the scale line is built with the ghost cursor placed at the horizontal position at which the text cursor would be located if the display were operating in the hidden codes mode. This ghost cursor position is as described when the operation is in the all codes mode.

Each of the remaining FIGS. 5-16 describe in greater detail the operation of the four subroutines shown in FIG. 4. Some of these subroutines involve still other subroutines which may, in turn, involve additional subroutines.

Figure 5:
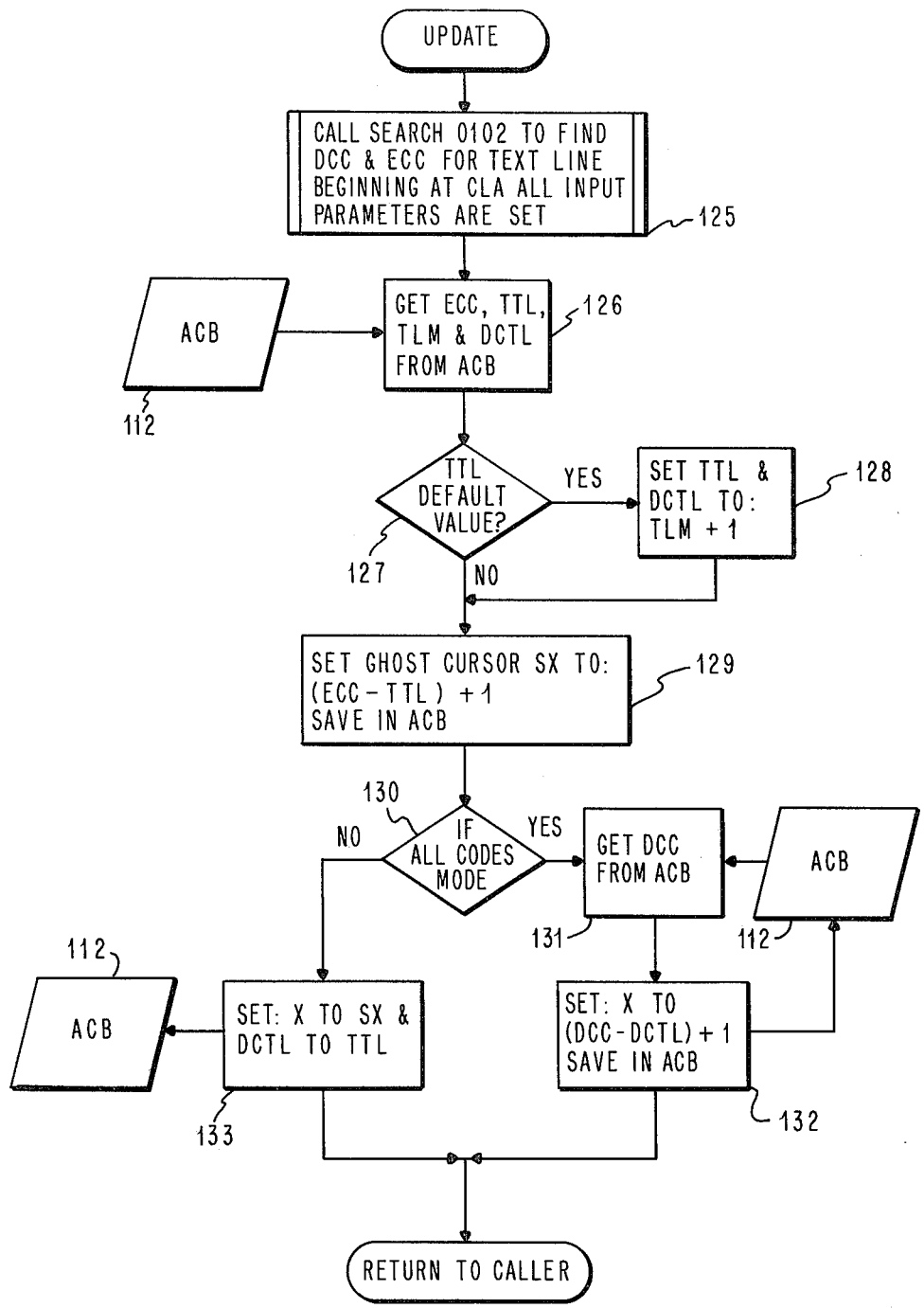
FIG. 5 illustrates the operation of the UPDATE subroutine called during the display access method illustrated in FIG. 4.
Figure 14:
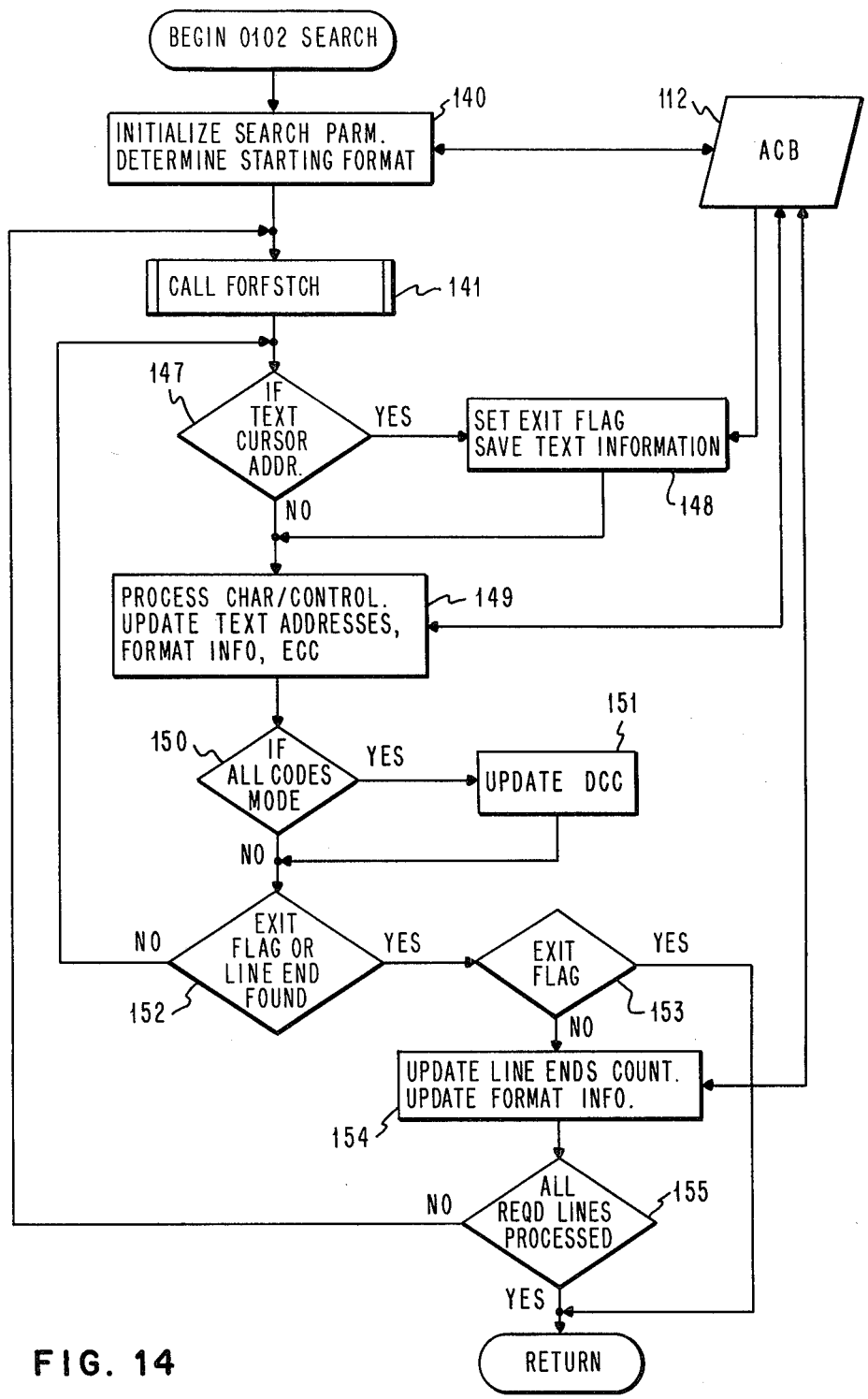
FIG. 14 illustrates the operation of the SEARCH 0102 subroutine called during the operation of the UPDATE subroutine of FIG. 5.

Referring now to FIG. 5 the UPDATE subroutine called for at 114 of FIG. 4 is described. At 125 of FIG. 5 the SEARCH 0102 subroutine is called to find the Displayable Characters Count and the Escapement Character Count for the text line beginning at the Cursor Line Address. At the beginning of the Display Access Method (FIG. 4) the input parameters required by the SEARCH 0102 subroutine were loaded into the ACB. These input parameters are the Cursor Line Address, the left margin of the text line associated with the CLA and the contextual cursor address. The SEARCH 0102 subroutine called for at this point is shown at FIG. 14. The purpose of the SEARCH 0102 subroutine is to scan the text codes and control codes on the line at which the cursor resided up to and including the new cursored character to update the Escapement Character Count and Displayable Character Count which will, in turn, provide the positions along the text line at which the ghost cursor and the text cursor should be placed when the line of text is built in the refresh buffer for display.

Referring to FIG. 14 the operation of the SEARCH 0102 subroutine begins at 140 wherein the search parameters are initialized by receiving inputs from the ACB, as listed above, including the Cursor Line Address, left margin of the cursor line, and contextual cursor address. The counters involved including those for the Displayable Character Count and Escapement Character Count are reset to zero.

Figure 12:
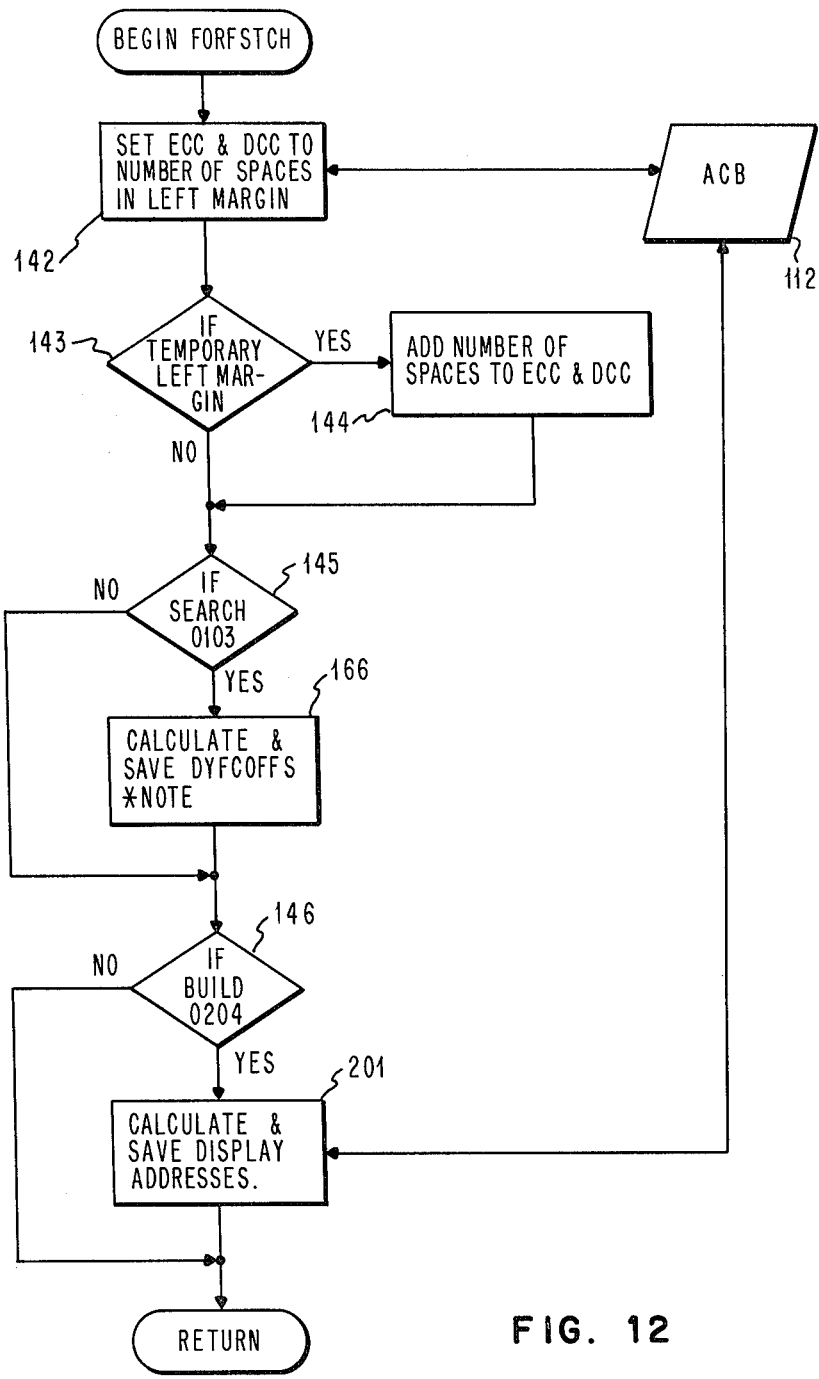
FIG. 12 illustrates the operation of the FORFSTCH subroutine called during the operation of the BUILD TEXT LINE subroutine of FIG. 11, the SEARCH 0102 subroutine of FIG. 14, and the SEARCH 0103 subroutine of FIG. 15.

The next step is to call the FORFSTCH subroutine shown in FIG. 12 and utilize a portion of this subroutine to initialize the Escapement Character Count and the Displayable Character Count in accordance with the chosen left margin settings. The Escapement Character Count and Displayable Character Count are initialized with the number of blank spaces in the left margin at 142 in FIG. 12. Next, at 143 a test is made to determine if a temporary left margin is operational, such as would be utilized in the case of a required (indent) tab relative to the beginning of the line. If so, the number of spaces associated with the indent tab is added to the Escapement Character Count and Displayable Character Count at 144. If no temporary left margin is set the ECC and DCC remain unchanged.

After the ECC and DCC are updated in this manner the operation returns, by virtue of negative tests at 145 and 146, to the test indicated at 147 in the SEARCH 0102 subroutine in FIG. 14. At 147, the address of the first character of text scanned is compared to the Contextual Cursor Address to determine if the character indicated by the text cursor is presently being scanned. If so, an EXIT flag is set at 148, and this flag and the text information up to this point are saved in the ACB. After this, or if a compare did not take place, at 149 the character is processed by testing to determine: if it is a displayable character or a non-displaying control code, if it causes forward escapement or reverse escapement in the hidden codes mode, etc. This information about the character is used to update the Escapement Character Count at 149 as follows: if the code is a normally displaying code in the hidden codes mode the ECC is incremented. If the code causes reverse escapement the ECC is decremented by the amount of the reverse escapement. If the code is a control code which causes forward escapement, such as a space or a tab, the ECC is incremented in accordance with the amount of horizontal space required for execution of the control code.

A test is made at 150 to determine if the system is operating in the all codes mode. If so, the Displayable Character Count is incremented at 151 by the amount of escapement associated with the code presently being scanned. If operation is in the hidden codes mode the operation proceeds to the test at 152 to determine whether either the EXIT flag has been set at 148 or a line end has been found, for example, by virtue of a carrier return code presently being scanned. If the neither of these conditions is met the operation loops back to the test at 147 relative to the next character on this line. This loop repeats itself for each character along the line until the line ends or the EXIT flag is set by virtue of scanning the character associated with the contextual cursor address. When the EXIT flag is encountered the operation at block 153 returns back to the UPDATE subroutine in FIG. 5. If the EXIT flag is not encountered but the line has ended, the operation proceeds through 154 and the test at 155 to the beginning of the FORFSTCH subroutine at 141 to scan succeeding lines of text, as described above, to determine an appropriate Escapement Character Count and Displayable Character Count related to the new cursor position at the conclusion of the keystroke.

At the conclusion of the SEARCH 0102 subroutine of FIG. 14, operation continues at 126 of the UPDATE subroutine, FIG. 5. At this time the UPDATE subroutine reads from the ACB 112 the current ECC and DCC provided by the SEARCH 0102 subroutine, as well as the values for the Text Left Margin, the Text Tube Left, and the Displayable Characters Tube Left if the later two values are given here as specified values to be used instead of default values.

At the test at 127, if the TTL and DCTL values are not specified, these values are set at 128 to a count of Text Left Margin plus one and operation proceeds to 129. With the appropriate values for Text Tube Left and Displayable Characters Tube Left (either set at 128 or given values obtained at 126) the operation proceeds at 129 to set the ghost cursor SX to a value equal to the Escapement Character Count minus the Text Tube Left count plus one. This value is saved in the Analysis Control Block 112 and defines the value at which the ghost cursor is set on the scale line relative to the left edge of the screen. Thus, if the ghost cursor SX value is determined to be 20 and the text tube left (and thus the left edge of the scale line) is set at 18, the ghost cursor will be found at position 38 along the scale line, which represents 20 character positions horizontally to the right from the beginning of the scale line.

A test is made at 130 to determine if the system is operating in the all codes mode or in the hidden codes mode. A determination of "NO" represents operation in the hidden codes mode and at 133 the text cursor horizontal count X is set to be equal to the ghost cursor SX count. The DCTL is set to equal to the TTL (if the path through 128 was not taken earlier) and these values are saved in the ACB 112 before the operation returns back to the DAM operation of FIG. 4. It will, thus, be understood that in the hidden codes mode the ghost cursor and text cursor track each other at all times.

If the test at block 130 indicates operation in the all codes mode the operation proceeds to 131 at which point the Displayable Character Count is fetched from the ACB 112. At 132 the text cursor horizontal position X is determined by subtracting the Displayable Characters Tube Left count from the Displayable Character Count and adding one. This X value thus determined is also saved in the ACB 112.

Either of the X values determined at 133 or 132, like the ghost cursor value SX, are counted upwardly from the beginning position on the scale line. Thus, at 132 for a text tube left of 18 and an X count of 60, the text cursor will be positioned on a text line at a point which is vertically aligned with the position on the scale marked, or otherwise denoted to be 78.

Figure 6:
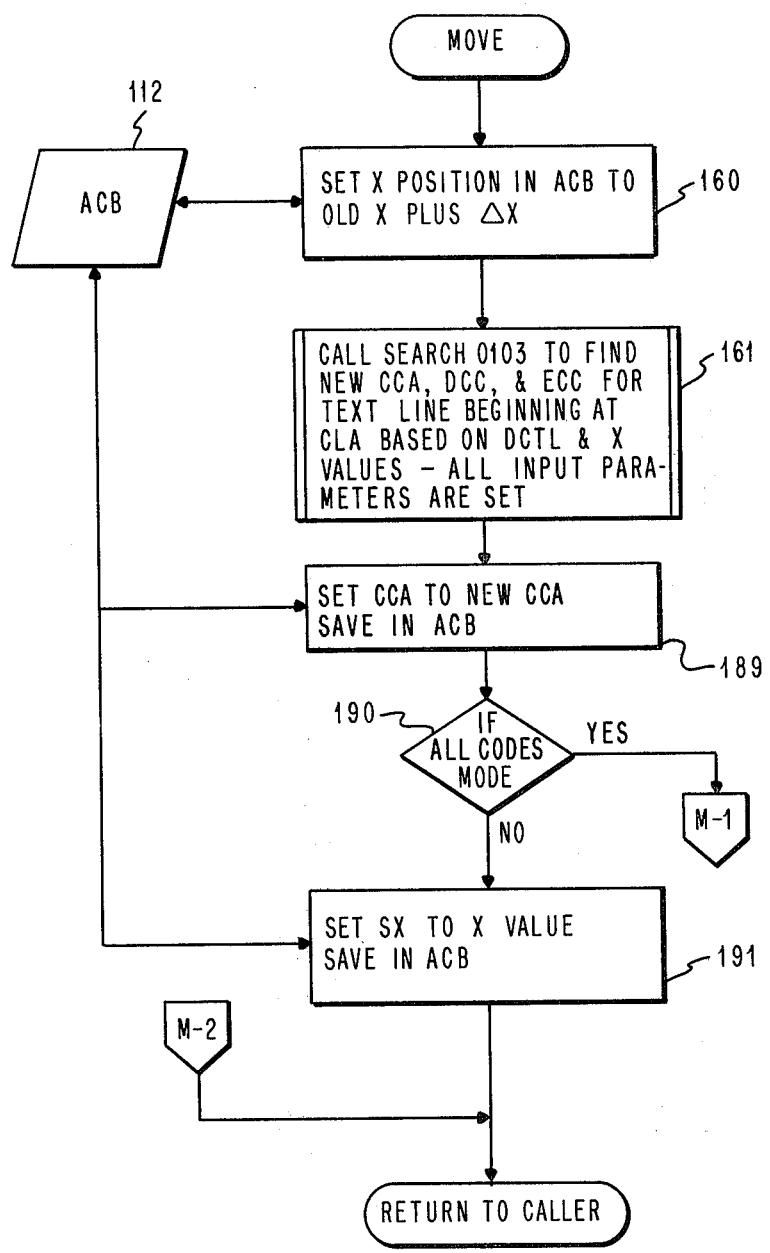
FIGS. 6 and 7 illustrate the operation of the MOVE subroutine called during the operation of the display access method of FIG. 4.

Referring back to FIG. 4, assume now that the test at 113 indicates that a MOVE command is present at 111, rather than an UPDATE command. In this case the operation proceeds to the MOVE subroutine indicated at 115 in FIG. 4. The MOVE subroutine in shown in detail in FIGS. 6 and 7. Referring to FIG. 6 the following inputs are loaded into the ACB for this subroutine: Cursor Line Address, left margin for the line beginning at the Cursor Line Address, the "old" text cursor X position on the line from which the cursor will be moved, the DCTL and TTL values if they are not to be default values, the ΔX from the old text cursor X position to the new text cursor X position, an indicator of whether the operation is in the all codes mode or the hidden codes mode, the line number on the screen on which the text cursor is positioned, and the line number on the screen on which the scale line is to be built.

Figure 15:
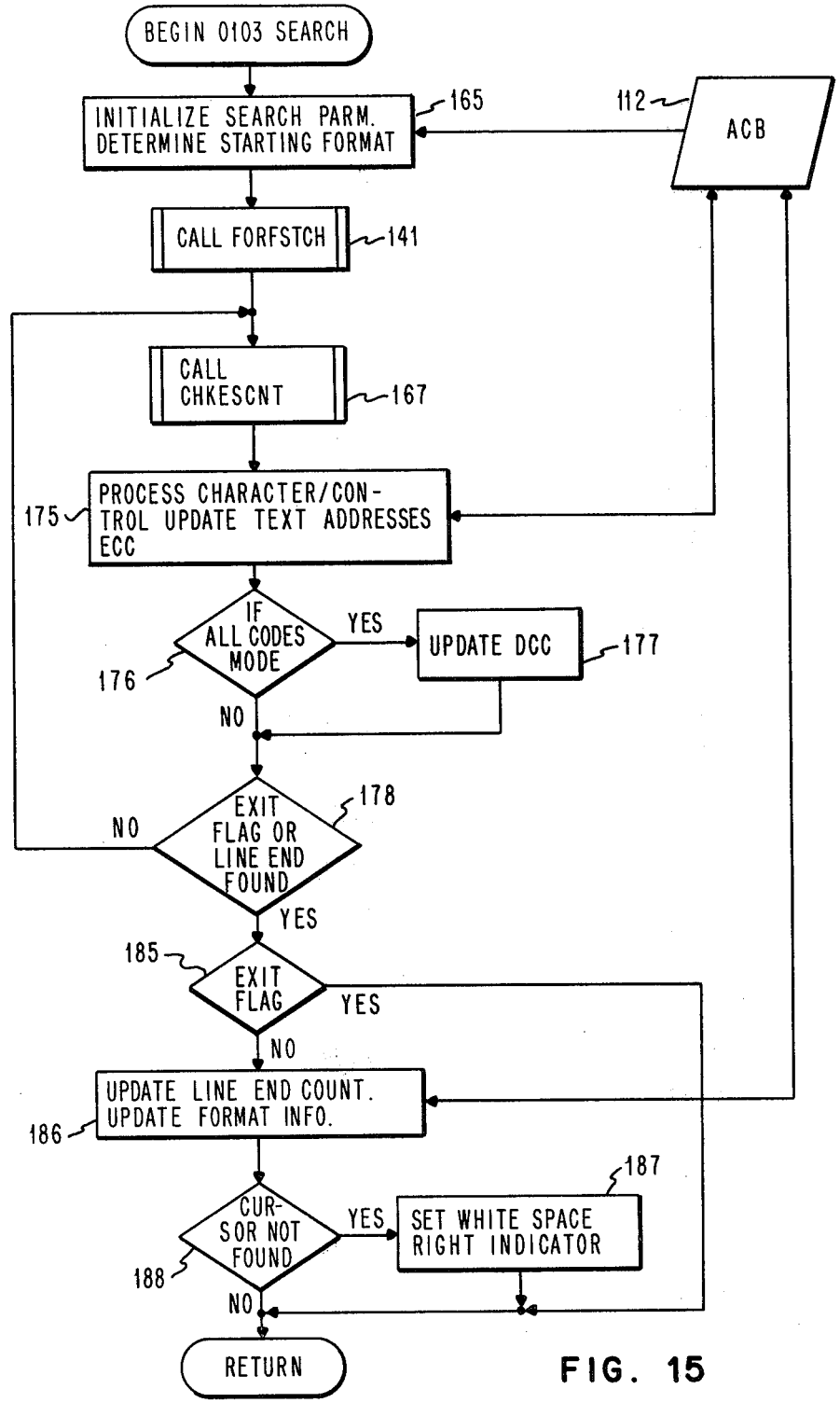
FIG. 15 illustrates the operation of the SEARCH 0103 subroutine called during the operation of the MOVE subroutine of FIG. 6.

In the MOVE subroutine at 160 the text cursor X positioned in the ACB 112 is set to sum of the "old" text cursor position from which the MOVE of the cursor begins plus ΔX. The MOVE subroutine proceeds to 161 at which time the SEARCH 0103 subroutine of FIG. 15 is called to use the Displayable Character Count and Escapement Character Count values to find the new Contextual Cursor Address. These values are based on the previously defined DCTL and X values.

In FIG. 15 the operation of the SEARCH 0103 subroutine begins at 165 wherein the search parameters are initialized. These parameters are already resident in the ACB 112 as indicated at 161 in FIG. 6. At 165 in the SEARCH 0103 subroutine of FIG. 15 the counters involved, including those for the Displayable Character Count and Escapement Character Count are reset to zero.

The next step is to call the FORFTCH subroutine shown in FIG. 12 and utilize a portion of this subroutine to initialize the ECC and DCC character count in accordance with the chosen left margins, as has been previously described relative to the SEARCH 0102 subroutine. When utilizing the FORFSTCH subroutine relative to SEARCH 0103 an additional step is shown at 166, FIG. 12, for calculating and saving in the ACB a value for DYFCOFFS, which is defined as the new spatial cursor position to search for, starting at the left paper edge. In the hidden codes mode DYFCOFFS is equal to (TTL-1) plus (X-1), where X is the new text cursor X position set at 160, FIG. 6. In the all codes mode DYFCOFFS is equal to the sum of (DCTL-1) plus (X-1), where X is also the new text cursor X position.

Figure 16:
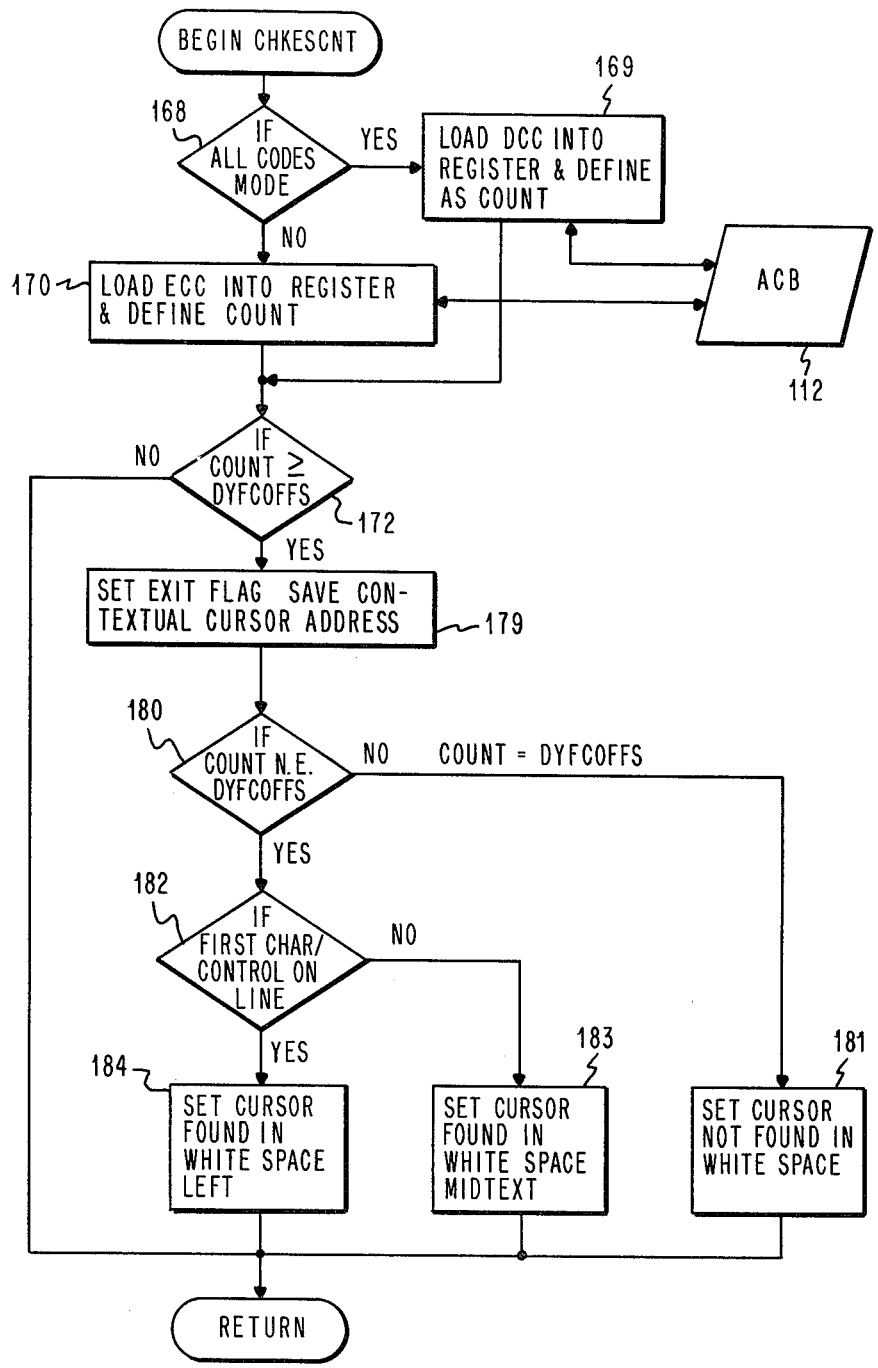
FIG. 16 illustrates the operation of the CHKESCNT subroutine called during the operation of the SEARCH 0103 subroutine of FIG. 15.

Returning now to the SEARCH 0103 subroutine, FIG. 15, the CHKESCNT subroutine is now called at 167, FIG. 15. In FIG. 16, the CHKESCNT subroutine begins at 168 by testing to determine whether the display operation is in the all codes mode or in the hidden codes mode. In the all codes mode the DCC is loaded into a register and defined as COUNT at 169, while in the hidden codes mode the ECC is loaded into a register and defined as COUNT at 170. At 172 COUNT is compared to DYFCOFFS. At 172, if COUNT is less than DYFCOFFS the operation returns to the SEARCH 0103 subroutine in FIG. 15.

Assuming for the moment that the CHKESCNT subroutine has returned to the SEARCH 0103 subroutine, the operation of the SEARCH 0103 in FIG. 15 continues at 175 at which point the character in the text storage buffer presently being addressed is examined to determine, for example, if it is a displayable character or a non-displaying code, if it causes forward escapement or reverse escapement in the hidden codes mode, etc. Additionally, if the code being addressed causes a format change, the change of format information is stored in the ACB 112. The information about the code being addressed is used to update the ECC as described relative to updating the ECC at 149 in the SEARCH 0102 of FIG. 14.

A test is made at 176 to determine if the system is operating in the all codes mode. If so, the DCC is incremented at 177 by the amount of escapement associated with the code presently being tested. If operation is in the hidden codes mode the operation proceeds to the test at 178 to determine whether either the EXIT flag has been set at 179 in the CHKESCNT subroutine, FIG. 16, or if a line end code has been detected when the addressed code was processed at 175. Assuming that the test is negative the operation loops back from 178 to the beginning of the CHKESCNT subroutine, FIG. 16. The new ECC or DCC, depending on the display mode is loaded into the register and defined as COUNT and this is compared, at 172, to the DYFCOFFS value. If the COUNT is found to be greater or equal to the DYFCOFFS value, the EXIT flag is set at 179 and the address of the last code in the text storage buffer processed by the SEARCH 0103 subroutine is saved in the ACB 112 as the contextual cursor address. Next, at 180 a test is made to determine if COUNT is not equal to DYFCOFFS. If this result is negative (COUNT=DYFCOFFS) the ACB is set to indicate that the cursor was not found in white space and the operation of this subroutine returns, as indicated by the output at 181, back to the SEARCH 0103 subroutine.

A test is made at 182 to determine whether the character presently being tested by the SEARCH 0103 subroutine is the first character or control code on the line of text. If it is not the ACB 112 is set to indicate that the cursor was found in mid text white space, as indicated at 183. If the test at 182 is positive the ACB is set at 184 to indicate that the cursor was found in white space to the left of text.

Returning back to the SEARCH 0103 subroutine, FIG. 15, from the CHKESCNT subroutine, when the test at 178 indicates that the EXIT flag has been set or that a line end code has been detected, the operation proceeds to a test at 185 to determine if the EXIT flag has been set. If the EXIT flag has been set the operation returns to the MOVE subroutine, FIG. 6, at 189. If the EXIT flag was not found, the line end count and format information are updated and stored in the ACB 112 at 186 and a test is then made at 188 to determine if the cursor was found. If the cursor was found the operation returns to the MOVE subroutine as described above. If the cursor was not found a white space right indicator is set in the ACB at 187 and operation returns to the MOVE subroutine.

Figure 7:
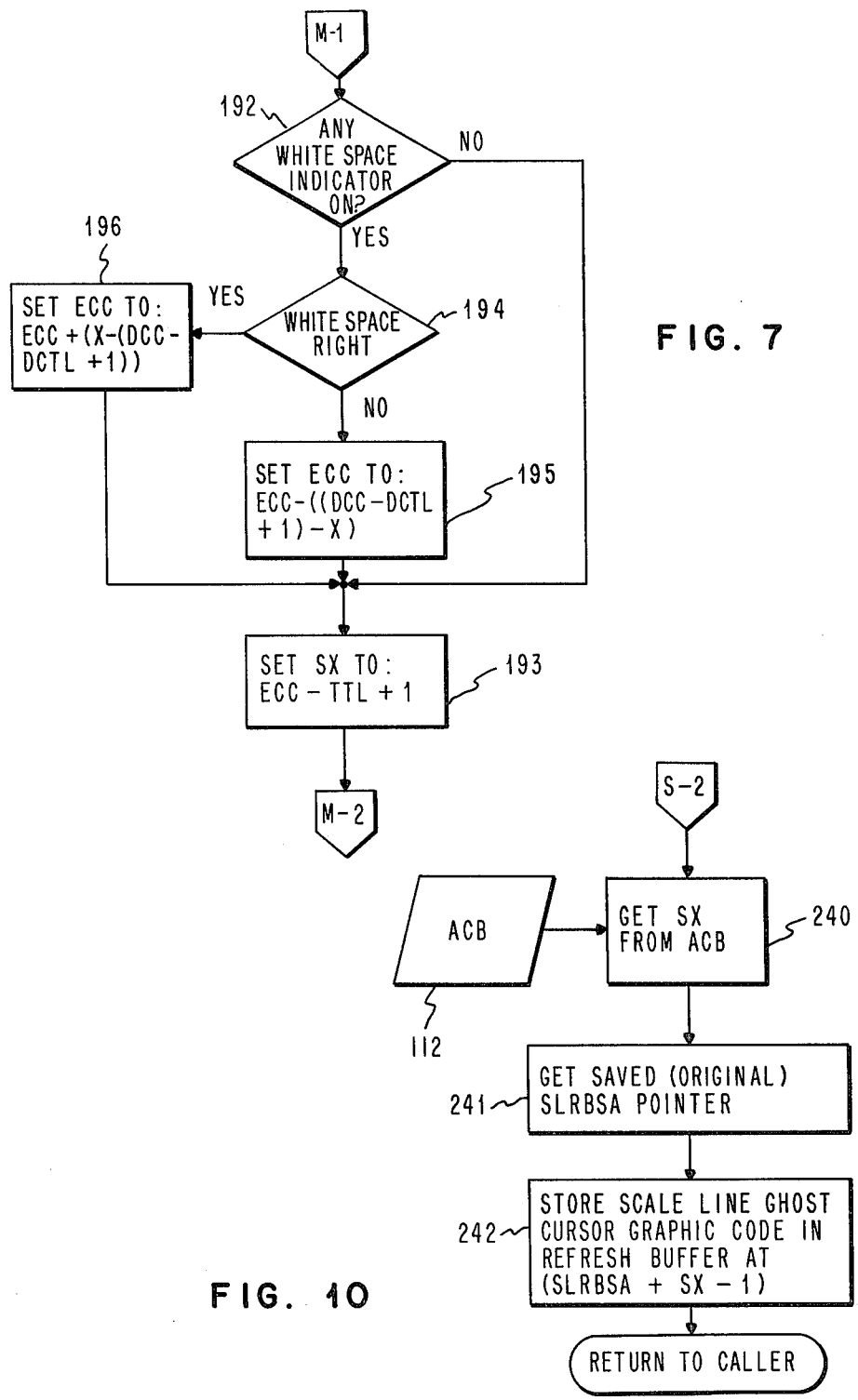

Continuing in the MOVE subroutine, FIG. 6, a test is made at 190 to determine whether or not the system is operative in the all codes mode or in the hidden codes mode. If operation is in the hidden codes mode the value for the ghost cursor position, SX, is set to the new text cursor value X determined at 160 and is stored in the ACB 112. The subroutine then returns to the Display Access Method of FIG. 4 at 116. Assuming that the display operation is in the display all codes mode, the operation continues, FIG. 7, with the test at 192 to determine if any of the white space indicators (set in the ACB 112 relative to 187, FIG. 15 or 184 or 183, FIG. 16) are on. If not, the ghost cursor position SX is set to the Escapement Character Count minus the Text Tube Left plus one and the operation is returned to the caller as shown in FIG. 7. If a white space indicator is on a test is made at 194 to determine if the White Space Right indicator is on. If not, at 195 the ECC is set as indicated in FIG. 7 before the ghost cursor SX position is calculated at 193. If the white space right indicator is on the ECC is set as indicated at 196 before it is used to calculate the ghost cursor position SX at 193.

Figure 11:
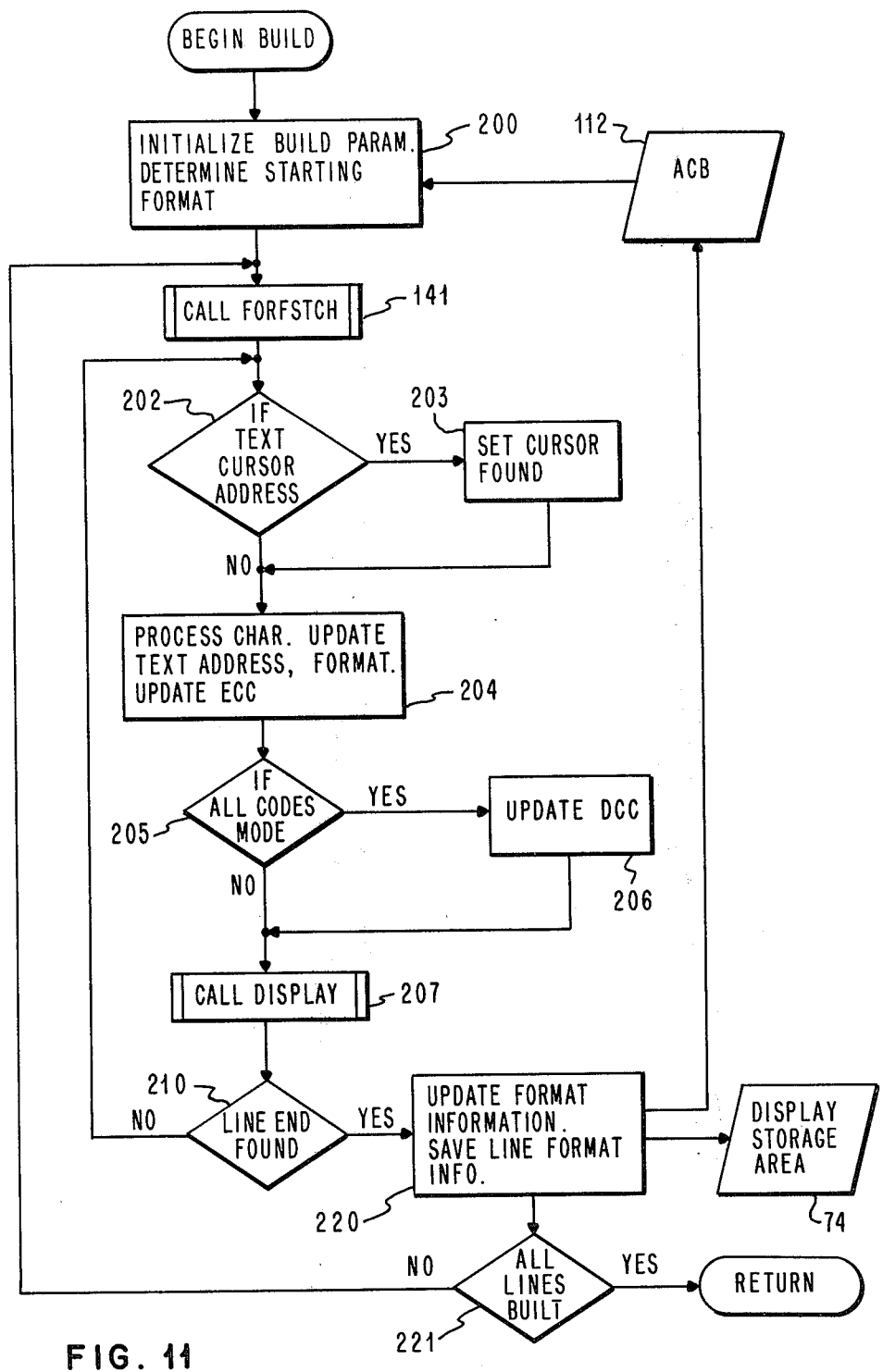
FIG. 11 illustrates the operation of the BUILD TEXT LINE subroutine called during the operation of the display access method of FIG. 4.

Referring back to FIG. 4, at the conclusion of either the MOVE or UPDATE subroutine, the next subroutine to be called by the Display Access Method is the BUILD TEXT LINE subroutine at 116 and described in detail reltive to FIG. 11. In FIG. 11 the BUILD TEXT LINE suroutine begins at 200 wherein the BUILD parameters re initialized. These parameters are already residnt in the ACB 112 as a result of the various storae and updating operations associated with the previously operated subroutines which have stored data in the ACB. Included in these initialized parameters are the Cursor Line Address, the left margin of the text line beginning at the Cursor Line Address, the X position of the text cursor, the DCTL, the CCA, and the text line number on the display screen.

The next step in the BUILD TEXT LINE subroutine is a call to the FORFSTCH subroutine at 141, which subroutine is shown in detail in FIG. 12. As previously described relative to the FORFSTCH subroutine the left margin and, if used, the temporary left margin are utilized to initialize the ECC and DCC to the sum of these counts as shown at 142, 143, and 144 of FIG. 12. The operation then jumps to 146 at FIG. 12 for a test of whether or not this subroutine is being called by the BUILD TEXT LINE subroutine. Since the result of this test is positive, at 201 the refresh display buffer addresses for the line being processed are calculated and saved in the ACB. The operation then returns to the BUILD TEXT LINE subroutine, FIG. 11.

In FIG. 11, at 202 the address of the first character of text is tested and compared to the Contextual Cursor Address to determine if the character indicated by the CCA is presently being addressed. If so, a CURSOR FOUND indication is set in the ACB 112. After this, or if the test was negative, at 204 the addressed character is processed by testing to determine: if it is a displayable character or a non-displaying control code, if it causes forward escapement or reverse escapement in the hidden codes mode, etc. This information about the character is used to update the ECC count as had been previously described relative to the SEARCH 0102 at 149 in that subroutine. The text storage buffer address is then incremented. At 205 a test is made to determine if the system is operating in the all codes mode. If so, the DCC is incremented at 206 by the amount of escapement associated with the code presently being scanned. At 207 the DISPLAY subroutine is called, which subroutine is shown in detail at FIG. 13.

Figure 13:
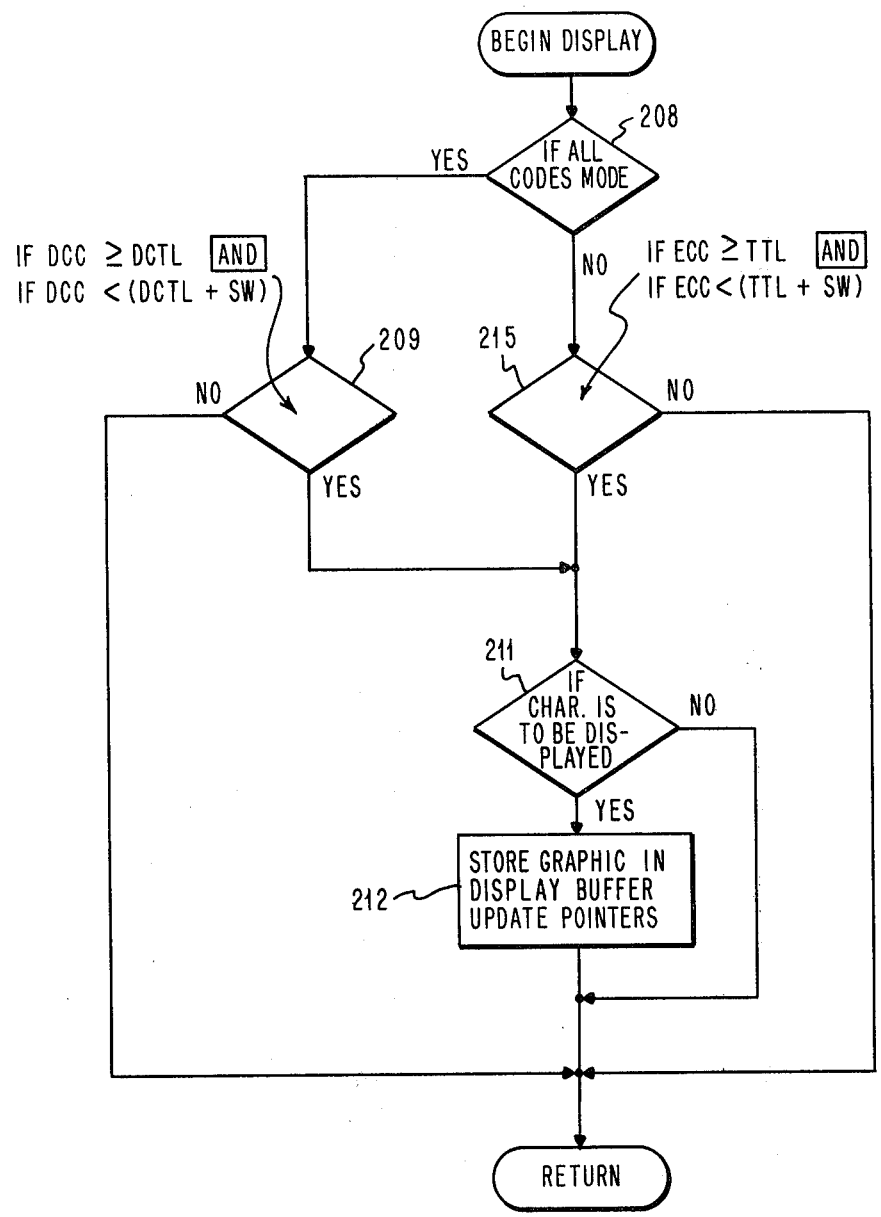
FIG. 13 illustrates the operation of the DISPLAY subroutine called during the operation of the BUILD TEXT LINE subroutine of FIG. 11.

Referring to FIG. 13 the DISPLAY subroutine begins with a test at 208 to determine if the system is operating in the all codes mode. If so, a test takes place at 209 to determine if both of the following conditions are true: DCC is equal to or greater than DCTL and DCC is less than the sum of DCTL plus Screen Width. If not, the operation returns back to the BUILD TEXT LINE subroutine, FIG. 11, for the test at 210 to determine if a line end has been found, for example, by virtue of a carrier return code presently being scanned. If this condition is not met the operation loops back to the test at 202 relative to the next character on this line. This loop repeats itself for each character along the line until the line ends. As this looping operation calls the DISPLAY subroutine of FIG. 13, the other paths through that subroutine are described as follow. Continuing to assume operation in the all codes mode, the result of a positive test at 209 causes a test at 211 to determine if the character presently being addressed is to be displayed. If not (for example, if the system is operating in the hidden codes mode and the character being tested is a non-displaying control code) the operation proceeds back to the BUILD TEXT LINE subroutine, FIG. 11. If, at 211 the character is to be displayed, the character is stored in the refresh buffer and the address pointers relative to that buffer are updated before the operation returns back to the BUILD TEXT LINE subroutine.

If the system is operating in the hidden codes mode the test at 208 is negative. A test is made at 215 to determine if both of the following conditions are true: ECC is equal to or greater than TTL and ECC is less than the sum of TTL plus the Screen Width. If so, the operation proceeds to the test at 211, as described above. If not, the operation returns to the BUILD TEXT LINE subroutine, FIG. 11.

Referring back to FIG. 11, when the line end is found a positive result of the test at 210 causes the operation to proceed to 220 whereby the format information relative to that line is updated and saved in a portion of the memory 74 (also shown in FIG. 2) dedicated to this type of data, as well as being saved in the ACB 112. The operation then proceeds to a test at 221 to determine if all lines have been built and stored in the Refresh Buffer for the display of the multiple lines of text on the display screen 26. If so, the operation returns to the Display Access Method of FIG. 4 so that the scale line may be built. If not, the operation loops back to the beginning of the FORFSTCH subroutine at 141, FIG. 11 and continues until all lines have been built.

Figure 8:
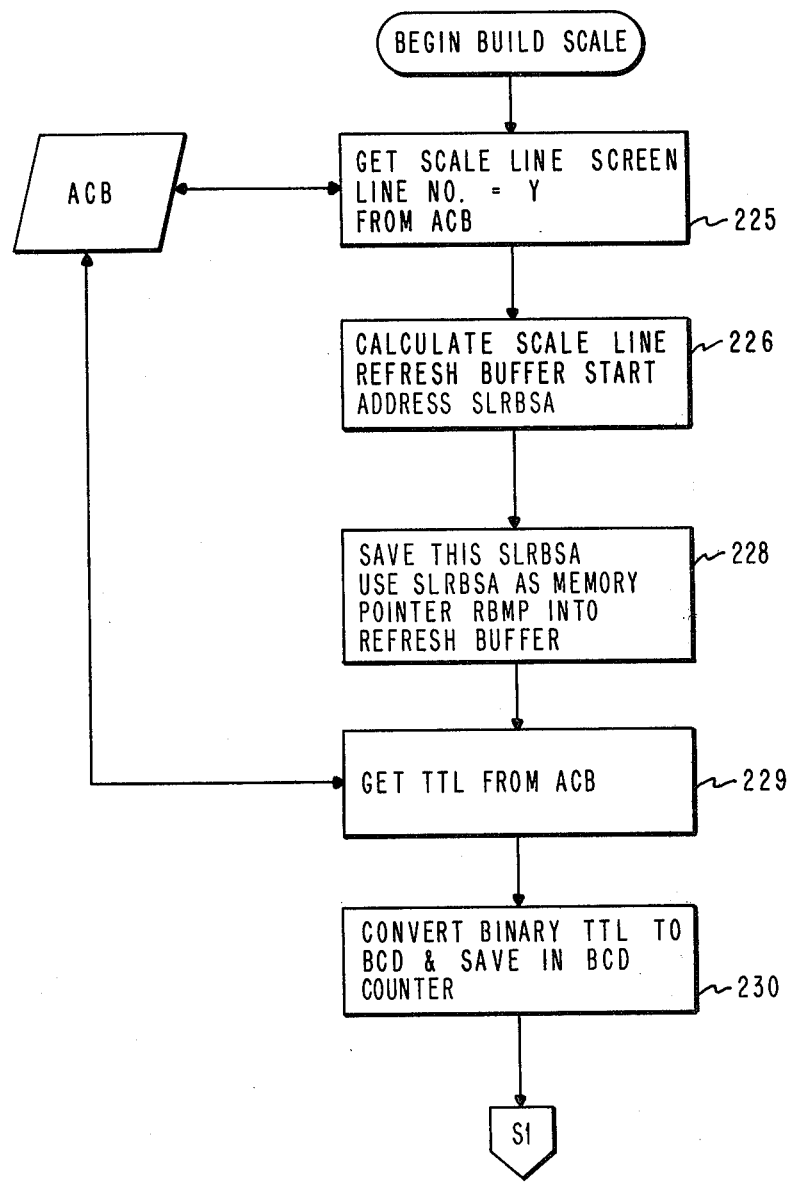

Proceeding in the Display Access Method with the BUILD SCALE LINE subroutine, FIG. 8, the screen line vertical count Y for the scale is read from the ACB at 225 and, at 226 (Y-1) is multiplied by the Screen Width to obtain an offset count relative to the refresh buffer for the beginning of the storage area for the scale line data. This offset is added to the Refresh Buffer Starting Address to obtain a scale line starting address in the refresh buffer defined as SLRBSA. At 228 the SLRBSA is saved in the ACB 112 and is used now as a memory pointer RBMP into the refresh buffer. At 229 the Text Tube Left value is read from the ACB 112 and at 230 this TTL value is converted from binary to Binary Coded Decimal (BCD) and saved in a BCD counter.

Figure 9:
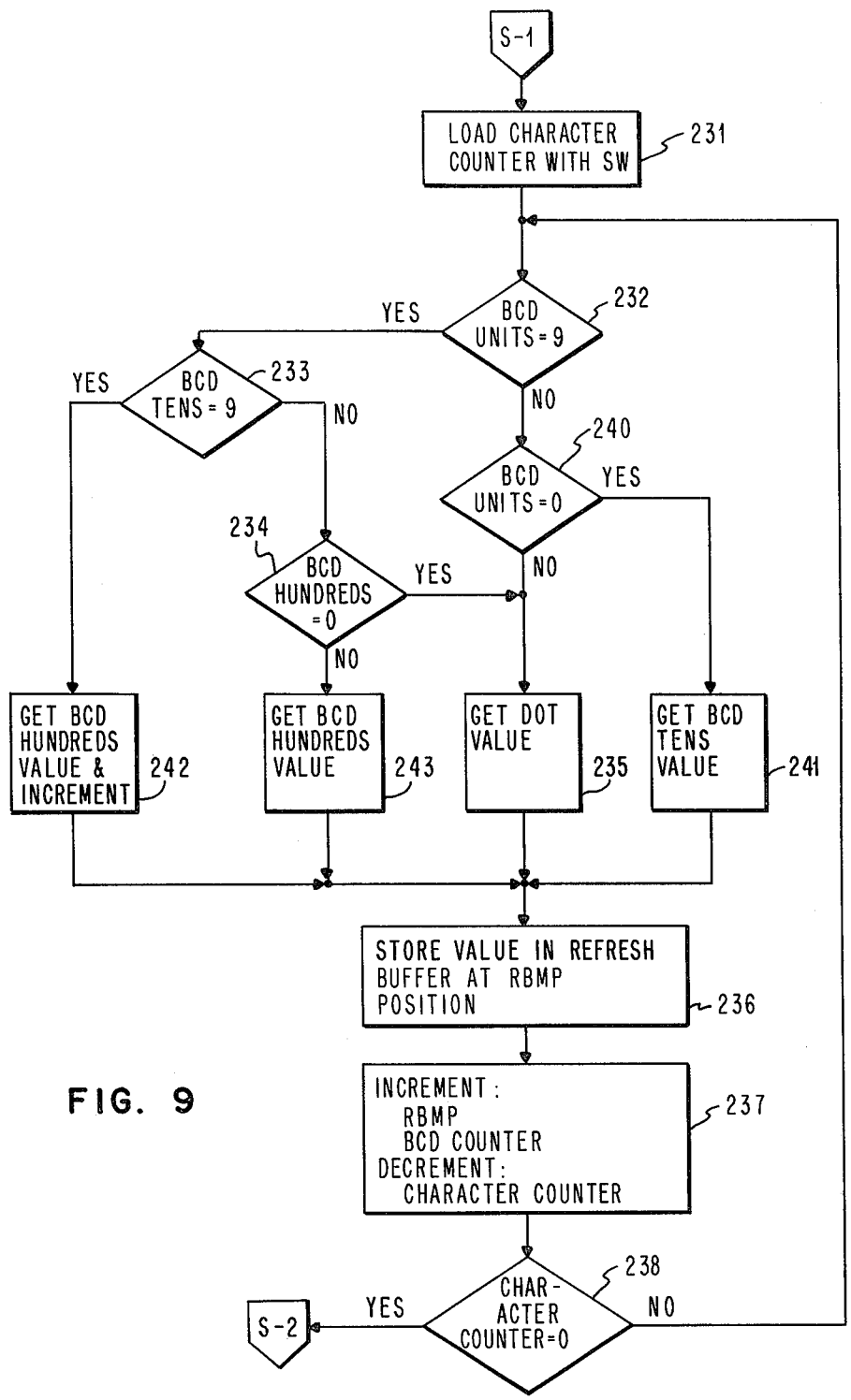

Continuing with this subroutine in FIG. 9, at 231 a character counter is loaded with the Screen Width value. At 232 the units position of the BCD counter (initialized with the TTL value) is tested for a decimal 9. Assuming that a 9 is found in the tens position, the 10's position of the BCD counter is tested for a 9 at 233. Assuming here that a 9 is not found at the tens position the 100's position of the BCD counter is tested for zero at 234. Assuming that a zero is found at the hundreds position at 235 a representation of a dot, vertical tick mark, or other graphic increment representation is fetched from a table or storage which stores this graphic and is loaded at 236 into the refresh buffer at the RBMP storage position. This is the first symbol representation on the scale line and if the Text Tube Left were 19 the results of the previously described test would be as previously assumed so that the first code stored relative to the scale line would be a dot. Next, at 237 the RBMP count and the BCD count are incremented and the character counter is decremented.

At 238 the character counter is tested for zero, and, assuming that it is not zero, the operation loops back to the test at 232. Assuming now that the result of the test at 232 is negative a test at 240 is performed to determine if the units position of the BCD counter is zero. If so, the 10's value of the BDC counter is obtained at 241 and, at 236 is loaded into the refresh buffer at the new RBMP position. This would be the case with the example above wherein the starting BCD count was 19. In this example, the code representative of a 2 is loaded into the refresh buffer. At 237 the RBMP and BCD counts are incremented and the character counter is decremented. Assuming that the character counter is not zero at 238 the operation loops back to the test at 232. These loops continues to build the appropriate dot or other tick marks and 10's and 100's numerical values for the scale line positions into the refresh buffer at 236.

The loop described above stops when the test at 238 determines that the character counter has been decremented to zero and the operation proceeds as shown at FIG. 10. At 240 the SX position for the scale line cursor is read from the ACB 112 and at 241 the SLRBSA starting value pointer, saved at 228, FIG. 8, is recalled. At 242 the value SX is added to the SLRBSA and the a "1" is subtracting from this sum to yield the address in the refresh buffer at which the scale ghost cursor graphic character indicator is to be stored. The operation then returns to the Display Access Method, FIG. 4 at which time all saved output parameters from the subroutines that have been invoked are, at 118, read from the ACB 112 and stored back into the DCB 66. The Display Access Method then returns as indicated 119.

A system and method have been described, therefore, in which a display is operable in an all codes mode for displaying a frame of text and control codes including a text cursor and a ghost cursor. In this all codes mode the text cursor is operable in the same manner in which it is operable in the hidden codes mode, that is, the text cursor is used to address a location relative to text or control codes at which an editing operation is to take place. Additionally, a ghost cursor is displayed adjacent the scale line to show the relative horizontal position along the text line to which the code addressed by the text cursor would correspond if the document were being displayed in the hidden codes mode or when the document is printed on a printer.

While the invention has been particularly shown and described with reference to a preferred embodiment thereof, it will be understood by those skilled in the art that various changes in form and details may be made therein without departing from the spirit and scope of the invention.

What is claimed is:

1. In a text display system operable in an all codes mode for displaying a frame of text and control codes including a text cursor adjacent a text code, control code, or display position at which a text processing operation can next be effected relative to text and control codes stored in a text storage buffer, the improvement comprising:

first means, while in said all codes mode, for determining a hidden codes mode position on the display screen associated with a current position of said text cursor; and second means, while in said all codes mode, for displaying a ghost cursor at said hidden codes mode position.

2. The text display system of claim 1 wherein said first means includes updating means for determining a scale line SX coordinate associated with said current position, said updating means further comprising:

means for adding one to the difference between an escapement character count and a text tube left count to yield said SX coordinate.

3. The text display system of claim 2 wherein said updating means further includes means for determining said escapement character count, comprising means for initializing a counter to store a first count associated with a left margin; and means for incrementing or decrementing said counter in accordance with the forward or reverse escapment, respectively, associated with each character and control code from the beginning of a text line containing said text cursor, up to the code or display position associated with said text cursor to yield said escapement character count.

4. The text display system of claim 1 wherein said first means includes move means for determining a scale line SX coordinate associated with said current position, said move means further comprising:

means for adding one to the difference between an escapement character count and a text tube left count to yield said SX coordinate.

5. The text display system of claim 4 wherein said move means further includes means for determining said escapement character count comprising means for initializing first and second counters to store a first count associated with a left margin, means for incrementing or decrementing said first counter in accordance with the forward or reverse escapement, respectively, associated with each character and control code from the beginning of a text line containing said text cursor, up to the code. or display position associated with said text cursor, to yield a preliminary escapement character count;

means for incrementing said second counter in accordance with the absolute escapement associated with each character and control code from the beginning of a text line containing said text cursor, up to the code or display position associated with said text cursor to yield a displayable character count;

means for determining an adjusted displaying character count by adding one to the difference between said displayable character count and a predefined displayable characters tube left count;

means, when no white space exists to the right of said current position, for subtracting a horizontal coordinate X associated with said current position from said adjusted displaying character count to yield a second count;

means, when no white space exists to the right of said current position, for setting said escapement character count to said preliminary escapement character count minus said second count;

means, when white space exists to the right of said current position, for determining a third count equal to the difference between said horizontal coordinate X and said adjusted displaying character count; and means, when white space exists to the right of said current position, for setting said escapement character count to the sum of said preliminary escapement character count and said third count.

6. The display system of claim 1 wherein said means, while in said all codes mode for displaying further comprises:

refresh buffer means for storing said frame of text including said text codes, a text cursor indicator, a ghost cursor indicator, and a scale line;

means for storing in said refresh buffer means, codes associated with a scale line grid having a plurality of indicia therealong and a reference number associated with scale position at every tenth position along said scale line.

7. The text display system of claim 6 further comprising means for storing a graphical indicator associated with said ghost cursor at said hidden codes mode position within the codes associated with said scale line grid.

8. In a method operable in an all codes mode for displaying a frame of text and control codes including a text cursor adjacent a text code, control code, or display position at which a text processing operation can next be effected relative to text and control codes stored in a text storage buffer, the improvement comprising:

determining, while in said all codes mode, a hidden codes mode position on the display screen associated with a current position of said text cursor; and displaying, while in said all codes mode, a ghost cursor at said hidden codes mode position.

9. In the method of claim 8 wherein said step of determining, while in said all codes mode, includes determining a scale line SX coordinate associated with said current position, said determining said SX coordinate further comprising:

means for adding one to the difference between an escapement character count and a text tube left count to yield said SX coordinate.

10. In the method of claim 8 wherein said step of displaying further comprises:

storing in a refresh buffer said frame of text including said text codes, a text cursor indicator, a ghost cursor indicator, and a scale line;

storing in said refresh buffer codes associated with a scale line grid having a plurality of indicia therealong and a reference number associated with scale position at every tenth position along said scale line.

11. In the method of claim 10 further comprising storing a graphical indicator associated with said ghost cursor at said hidden codes mode position within the codes associated with said scale line.

* * * * *